Patented Aug. 18, 1925.

1,550,360

UNITED STATES PATENT OFFICE.

JOSEF HUBER, OF DESSAU, IN ANHALT, AND PAUL ECKERT, OF DESSAU-ZIEBIGK, IN ANHALT, GERMANY, ASSIGNORS TO ACTIEN GESELLSCHAFT FÜR ANILIN FABRIKATION, OF BERLIN.

FORMED VISCOSE.

No Drawing. Application filed August 14, 1924. Serial No. 732,109.

*To all whom it may concern:*

Be it known that we, JOSEF HUBER and PAUL ECKERT, citizens of the German Republic, residing at Dessau, in Anhalt, Germany, and Dessau-Ziebigk, in Anhalt, Germany, have invented certain new and useful Improvements in Formed Viscose, of which the following is a specification.

It is known to add mucilagenous extracts of the vegetable origin to the viscose or to the dry cellulose from which the viscose is to be made and in the French specification 361,319 there is described the addition of alkali silicates to the viscose for the purpose preventing the threads from sticking together.

By the present invention inorganic colloids such as alkali silicates are added to the lye destined for dissolving the xanthate. Such an addition to the lye has a quite different effect than that which is obtained, when the same addition is made to the viscose. The threads, bands, films, artificial horsehair and the like formed from such mixtures have particularly good physical properties. The artificial silk, for instance, has a greater strength, elongation, resistivity against abrasion, and is less hygroscopic. The invention is particularly adapted to the production of products having a pronounced stiffness. For example artificial horsehair and artificial hemp have the desired stiffness. The filaments are for instance especially adapted for the manufacture of incandescent mantles.

The following example illustrates, in what manner the invention may be performed, without limiting it.

To the lye destined for dissolving the xanthate 3% technical sodium silicate is added. The working up takes place as usual.

In our companion application Ser. No. 732,110, filed concurrently herewith we have disclosed the addition of emulsoids, such as vegetable mucilage, to the lye in which xanthate is to be dissolved for modifying the physical properties of viscose silk produced therefrom.

What we claim is,—

1. In the manufacture of formed viscose adding to the lye in which the xanthate is to be dissolved an inorganic colloid capable of modifying the physical properties of the formed viscose.

2. In the manufacture of formed viscose adding to the lye in which the xanthate is to be dissolved an alkali silicate.

3. In the manufacture of formed viscose adding to the lye in which the xanthate is to be dissolved sodium silicate.

In testimony whereof we affix our signatures.

JOSEF HUBER.
PAUL ECKERT.